United States Patent
Du

(10) Patent No.: US 8,375,398 B2
(45) Date of Patent: Feb. 12, 2013

(54) METHOD AND SYSTEM FOR SHARING CONFIGURATION PARAMETERS AMONG PROCESSES OF AN ELECTRONIC DEVICE

(75) Inventor: Yao-Hong Du, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 808 days.

(21) Appl. No.: 12/507,139

(22) Filed: Jul. 22, 2009

(65) Prior Publication Data

US 2010/0043012 A1  Feb. 18, 2010

(30) Foreign Application Priority Data

Aug. 14, 2008 (CN) .......................... 2008 1 0303758

(51) Int. Cl.
*G06F 9/44* (2006.01)
(52) U.S. Cl. .................. 719/312; 719/321; 719/327
(58) Field of Classification Search .................. None
See application file for complete search history.

(56) References Cited

U.S. PATENT DOCUMENTS

| | | | |
|---|---|---|---|
| 6,871,350 B2 * | 3/2005 | Wong et al. .................. | 719/323 |
| 7,167,982 B2 | 1/2007 | Elliott et al. | |
| 7,203,774 B1 * | 4/2007 | Zhou et al. .................. | 710/17 |
| 7,290,114 B2 | 10/2007 | Stillwell, Jr. et al. | |
| 7,404,193 B2 * | 7/2008 | Hen et al. .................. | 719/327 |
| 2003/0014466 A1 * | 1/2003 | Berger et al. ................ | 709/102 |
| 2003/0023707 A1 * | 1/2003 | Ryan .............................. | 709/220 |
| 2003/0135663 A1 * | 7/2003 | Duncan et al. ................ | 709/321 |
| 2004/0059821 A1 * | 3/2004 | Tang et al. .................... | 709/228 |
| 2004/0064459 A1 * | 4/2004 | Pooni et al. .................... | 707/100 |
| 2006/0242333 A1 * | 10/2006 | Johnsen et al. ................ | 710/30 |
| 2006/0253859 A1 * | 11/2006 | Dai et al. ........................ | 719/321 |
| 2007/0300103 A1 * | 12/2007 | Verbowski et al. ............. | 714/37 |
| 2008/0016189 A1 * | 1/2008 | Yoo ................................ | 709/220 |
| 2008/0168475 A1 * | 7/2008 | de Cesare et al. ............. | 719/321 |

FOREIGN PATENT DOCUMENTS

| | | |
|---|---|---|
| CN | 1896992 A | 1/2007 |
| TW | 200513874 | 4/2005 |
| TW | I232382 | 5/2005 |

* cited by examiner

*Primary Examiner* — Emerson Puente
*Assistant Examiner* — Hiren Patel
(74) *Attorney, Agent, or Firm* — Altis Law Group, Inc.

(57) ABSTRACT

An electronic system comprises a memory, a parser, and a device driver. A plurality of applications and a document are stored in a user space of the memory, the document storing configuration parameters. The parser module parses the document to retrieve the parameters in response to invocation from at least one application. The device driver creates data structure for the parameters in the kernel space of the memory, thus to facilitate a plurality of programs to execute different functions of the system by commonly utilizing the parameters through the device driver.

15 Claims, 9 Drawing Sheets

/ 12a

```
- <ConfigTree>
  - <SystemInfo>
      <protocol autoScan="enable" upnp="enable" igmpSnp="disable" igmpMode="disable"
      macFilterPolicy ="forward" encodePassword="enable" enetwan="disable" />
      <sysLog state="disable" displayLevel="ERR" logLevel="DEBUG" option="local"
      serverIP="0.0.0.0" serverPort="514" />
      <sysUserName value="admin" />
  </SystemInfo>
```
— B1

```
  - <AtmCfg>... </AtmCfg>
  - <AtmCfgTd> ... </AtmCfgTd>
  - <AtmCfgVcc>... </AtmCfgVcc>
  - <SecCfg>
      <srvCtrlList ftp="enable" http="lan" icmp="enable" ssh="enable" telnet="enable" tftp="enable" />
      <dmzHost ipAddr="0.0.0.0" />
  </SecCfg>
  - <Lan>
      <entry9999 address="1.1.1.1" mask="255.255.255.0" dhcpServer="disable" leasedTime="0"
      startAddr="0.0.0.0" endAddr="0.0.0.0" instanceId="1509949446" />
      <entry1 address="192.168.1.1" mask="255.255.255.0" dhcpServer="enable" leasedTime ="86400"
      startAddr="192.168.1.2" endAddr="192.168.1.254" instanceId="1509949441" />
  </Lan>
```
— B2

```
  - <WirelessCfg> ... </WirelessCfg>
  - <RouteCfg> ... </RouteCfg>
  - <PMapCfg>... </PMapCfg>
  - <SNTPCfg> ... </SNTPCfg>
  - <Voice>... </Voice>
```
— B3

```
  - <TelnetAcl>
      <telnetlist 1 ipaddress="192.168.0.0" subnetmask="255.255.248.0" />
      <telnetlist 2 ipaddress="212.94.162.0" subnetmask="255.255.255.128" />
      <telnetlist 3 ipaddress="80.118.192.0" subnetmask="255.255.248.0" />
      <telnetlist 4 ipaddress="10.0.32.0" subnetmask="255.255.224.0" />
      <telnetlist 5 ipaddress="84.96.217.0" subnetmask="255.255.255.0" />
      <telnetlist 6 ipaddress="172.16.255.0" subnetmask="255.255.255.0" />
  </TelnetAcl>
  - <pppsrv_8_35>
      <ppp_conId1 userName="" password="" serviceName="" idleTimeout="0" ipExt="disable"
      auth="auto" useStaticIpAddr="0" localIpAddr="0.0.0.0" Debug="disable" />
  </pppsrv_8_35>
  - <wan_8_35>
      <entry1 vccId="1" conId="1" name="pppoe_8_35_1" protocol="PPPOE" encap="LLC"
      firewall="enable" nat="enable" igmp="enable" vlanId="-1" service="enable"
      instanceId="1509949442" />
  </wan_8_35>
  ...
</ConfigTree>
```

Fig. 5

METHOD AND SYSTEM FOR SHARING CONFIGURATION PARAMETERS AMONG PROCESSES OF AN ELECTRONIC DEVICE

CROSS-REFERENCE TO RELATED APPLICATIONS

This application claims the benefit of priority from Chinese Patent Application No. 200810303758.7, filed on Aug. 14, 2008 in the People's Republic of China. The entirety of the above-mentioned patent application is hereby incorporated by reference herein in its entirety.

BACKGROUND

1. Technical Field

The disclosure relates to electronic devices, and more particularly to an electronic device system capable of sharing configuration parameters among processes.

2. Description of Related Art

The extensible markup language (XML) is commonly utilized to organize various software parameters as a document. An application may invoke functions or relative libraries to analyze XML documents to retrieve parameters. Since the parameters may be proprietary to an application, sharing of the parameters with other applications or with an operating system kernel is difficult.

With reference to FIG. 1, a main memory 100 comprises a user space and a kernel space. Applications 10a-10b and a document 12 of configuration parameters are located in the user space while an operating system kernel is located in the kernel space. When an application accesses the configuration parameters, the application parses the document 12 to rearrange the configuration parameters in a tree structure, referred to as a configuration tree, such as trees 11a-11c in FIG. 1, according to an interior structure of the document. Each node of the configuration tree records a parameter value. The application allocates the configuration tree in a private area of the application which is unknown and inaccessible by other programs. This underlies the difficulty of parameters synchronization or sharing among processes.

Sharing of configuration parameters among applications, however, is necessary in some circumstances. In an example of an asymmetric digital subscriber line (ADSL) modem, after a program utilizes point-to point protocol (PPP) or dynamic host configuration protocol (DHCP) to acquire an internet protocol (IP) address, other programs in the modem, such as a network address translation (NAT) program and/or a firewall program may require retrieval of the IP address. Configuration trees in FIG. 1 hinder configuration parameter sharing or synchronization among programs. Additionally, an operating system kernel 13 in FIG. 1 may face similar difficulty in accessing configuration trees or configuration parameter documents.

BRIEF DESCRIPTION OF THE DRAWINGS

FIG. 5 is a schematic diagram of one embodiment of a configuration parameters document of the disclosure;

DETAILED DESCRIPTION

The disclosure may be implemented in various device or systems, such as routers, ADSL devices, cable modems, or set-top boxes (STBs).

Figure 1:
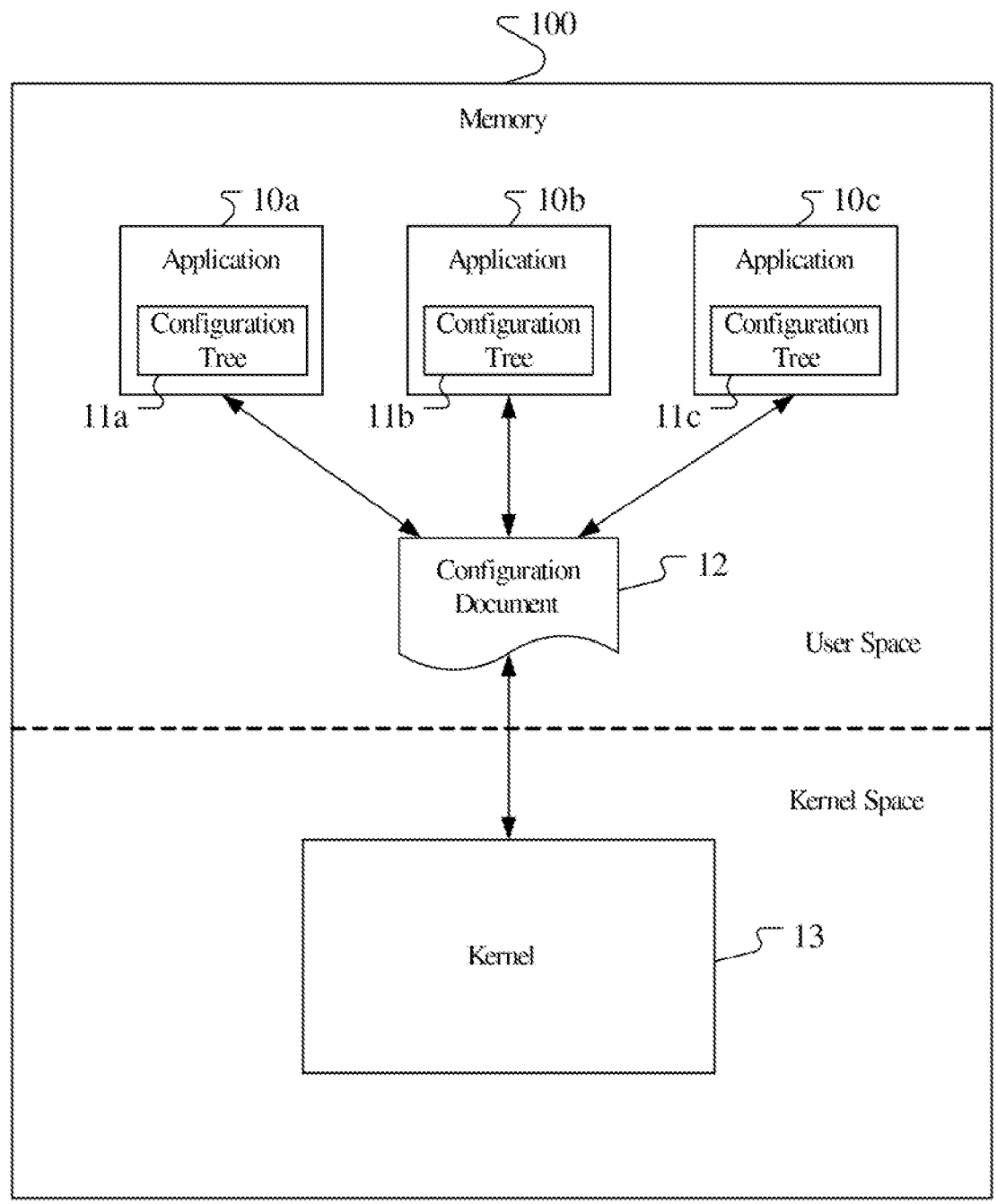
FIG. 1 is a schematic diagram of a commonly used configuration tree in a main memory.
Figure 2:
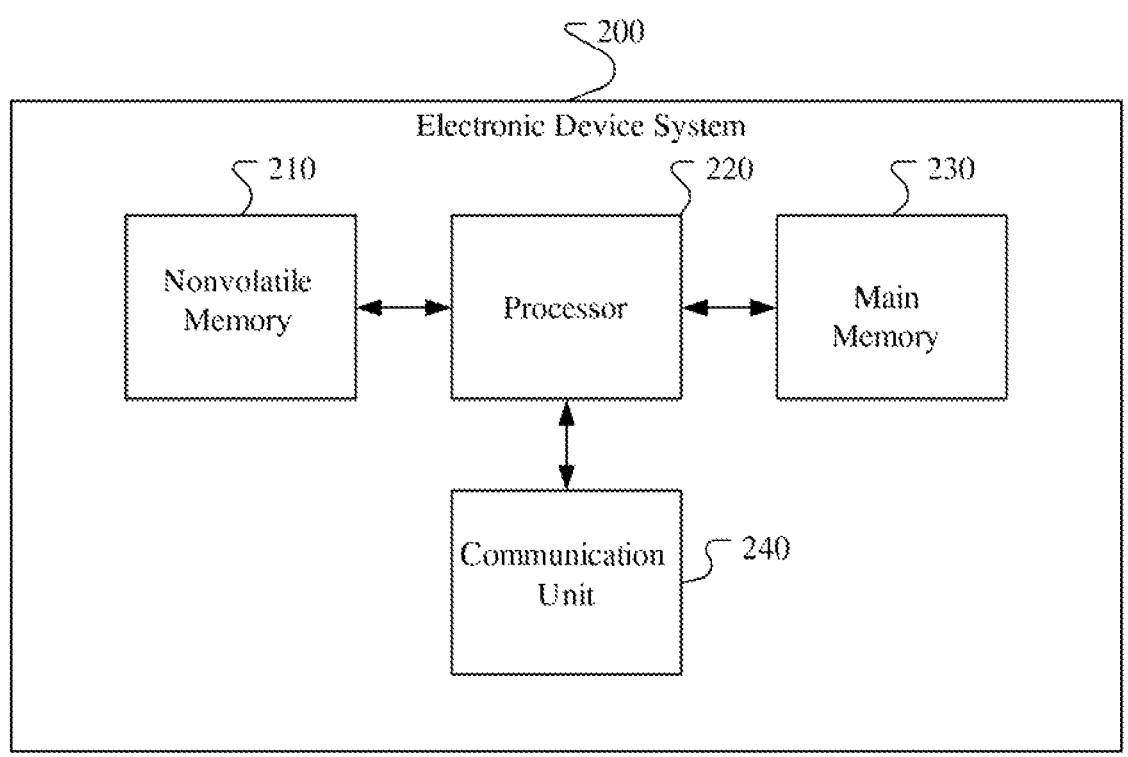
FIG. 2 is a block diagram of one embodiment of an electronic device system of the disclosure.

With reference to FIG. 2, an electronic device system 200 comprises a nonvolatile memory 210, a processor 220, a main memory 230, and a communication unit 240. The communication unit 240 may comprise communication ports and various components, such as antennas and controllers thereof, a digital signal processor (DSP), an analog-to-digital converter, a tuner in a cable modem, an Ethernet controller, a universal serial bus (USB) controller, and/or a peripheral component interconnect (PCI) controller. The processor 220 may be made up of integrated circuits (IC) implementing processes and/or executing programs. The processor 220 may be packaged as one IC chip or multiple interconnected IC chips. For example, the processor 220 may be a central processing unit (CPU) or a combination of a CPU and a communication controller. The communication controller controls communication between components of the electronic device system 200 and/or communication between the electronic device system 200 and an external device. Note that the communication components may be integrated into the communication unit 240 or the processor 220.

The main memory 230 may comprise one or more types of random access memory (RAM), Examples of the nonvolatile memory 210 may comprise electrically erasable programmable read-only memory (EEPROM) or flash memory. The nonvolatile memory 210 stores an operating system (OS) and applications of the electronic device system 200. Programs and data may be stored in the nonvolatile memory 210 in compressed formats, for decompression and loading to main memory 230 before execution or retrieval of the programs and data.

Figure 3:
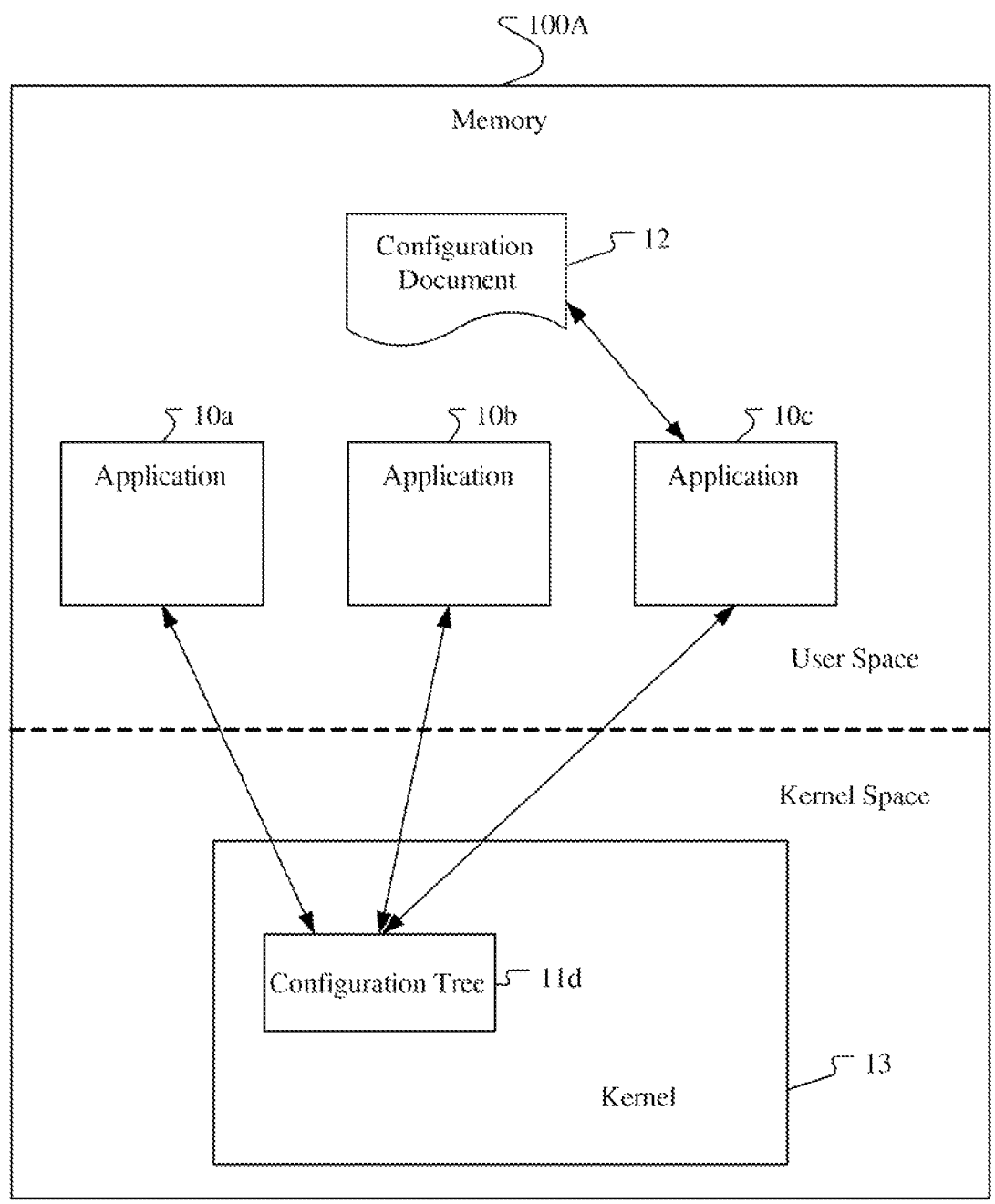
FIG. 3 is a schematic diagram showing one embodiment of a configuration of the disclosure of a configuration tree in a main memory.

With reference to FIG. 3, the electronic device system 200 may comprise a main memory 100A. The main memory 100A may be a virtual memory mapped to an area on the main memory 230 or the nonvolatile memory 210. The main memory 100A comprises a user space and a kernel space. A document 12 comprises configuration parameters privileged to an application 10c, which is to be shared by other applications.

One application (such as the application 10c in FIG. 3) in the electronic device system 200 activates parsing of the document 12. A kernel 13 builds a configuration tree (such as a tree 11d) in the kernel space of the main memory 100A corresponding to the document 12 in the user space of the main memory 100A according to relationships of configuration parameters in the document 12. Each application which is to read or modify parameters in the tree 11d is required to utilize the kernel 13 to read or modify. Data structure of configuration parameters is organized as trees in the disclosed embodiments but is not limited thereto, and may alternatively be organized as arrays or linked lists. Each of applications 10a-10c may read or modify parameters in the tree 11d through the kernel 13. An exemplary embodiment of electronic device system is detailed with reference to FIG. 4.

Figure 4:
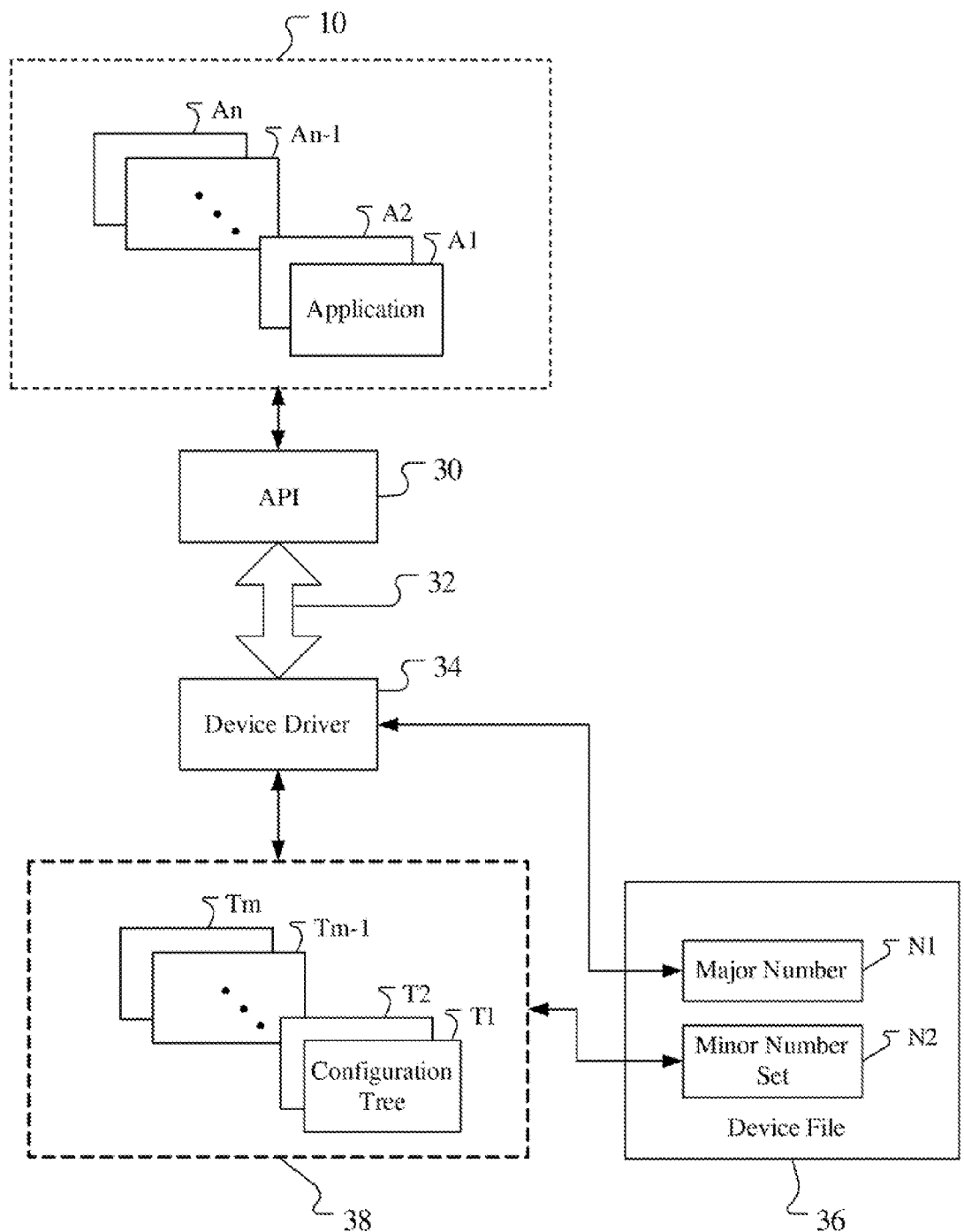
FIG. 4 is a schematic diagram of one embodiment of software functional blocks of an electronic device system of the disclosure.

In FIG. 4, the electronic device system 200 comprises a group 10 of applications A1-An, where n is a positive integer greater than one. Examples of the applications A1-An may comprise the applications 10a-10c in FIG. 3. The electronic device system 200. The electronic device system 200 further comprises an application programming interface (API) 30, system calls 32 provided by the kernel 13, a device driver 34, and a device file (or device special file) 36.

The API 30 comprises function library including functions for analyzing configuration parameter documents (such as document 12), functions for building configuration trees based on the analysis, and functions for reading and modifying parameter values in the configuration tree. Since configuration trees are located in the kernel space, functions in the API 30 may utilize system calls (such as "ioctl" in the Linux operating system) provided by the kernel 13 to trigger the kernel 13, whereby the kernel 13 further triggers the device 34 to establish, read, or modify configuration trees in a group 38 thereof. The group 38 comprises configuration trees T1-Tm, wherein m is a positive integer greater than one. For example, configuration trees in the group 38 can comprise the configuration tree 11d in FIG. 3.

In Unix, Linux, or Unix-similar OSs, a device file represents a device and a device driver thereof, and is stored in a directory "/dev", thus to enable interaction with the device driver by an application through standardized input/output system calls. Here, the device file is named "xmlconf" and represents the group 38 and configuration trees therein. In FIG. 4, a major number N1 in the device file 36 is a number representing the device driver 34, and a minor number set N2 comprises multiple minor numbers each representing one of configuration trees T1-Tm. Each application in group 10, functions in the API 30, and the device driver 34 can utilize the device file 36 to specify, and read or write one configuration tree.

An application may open the device file /dev/xmlconf to retrieve the major number N1 and subsequently request the kernel 13 to locate and utilize the device driver 34 based on the major number N1. The device driver 34 may locate a specific configuration tree based on a minor number in the device file /dev/xmlconf and modify or read parameter values in the specific configuration tree in response to requests from the application.

Device files may comprise, for example, character special file (corresponding to a character device) and block special file (corresponding to a block device). The character special file specifies a character device and that the data exchanged between the character device and an OS is in character units. The block special file specifies a block device and that the data exchanged between the block device and an OS is in block units. A block unit is greater than a character unit. Examples of the character devices may comprise modems and telephony devices. Examples of the block devices may comprise hard disk drives and optical disc drives. The device driver 34 retrieves and returns parameter values in a node of a configuration tree for each read request, and thus the device file 36 is preferably a character device. An example of parsing a configuration document to generate a corresponding configuration tree of the document is given in the following:

EXAMPLE 1

Figure 6:
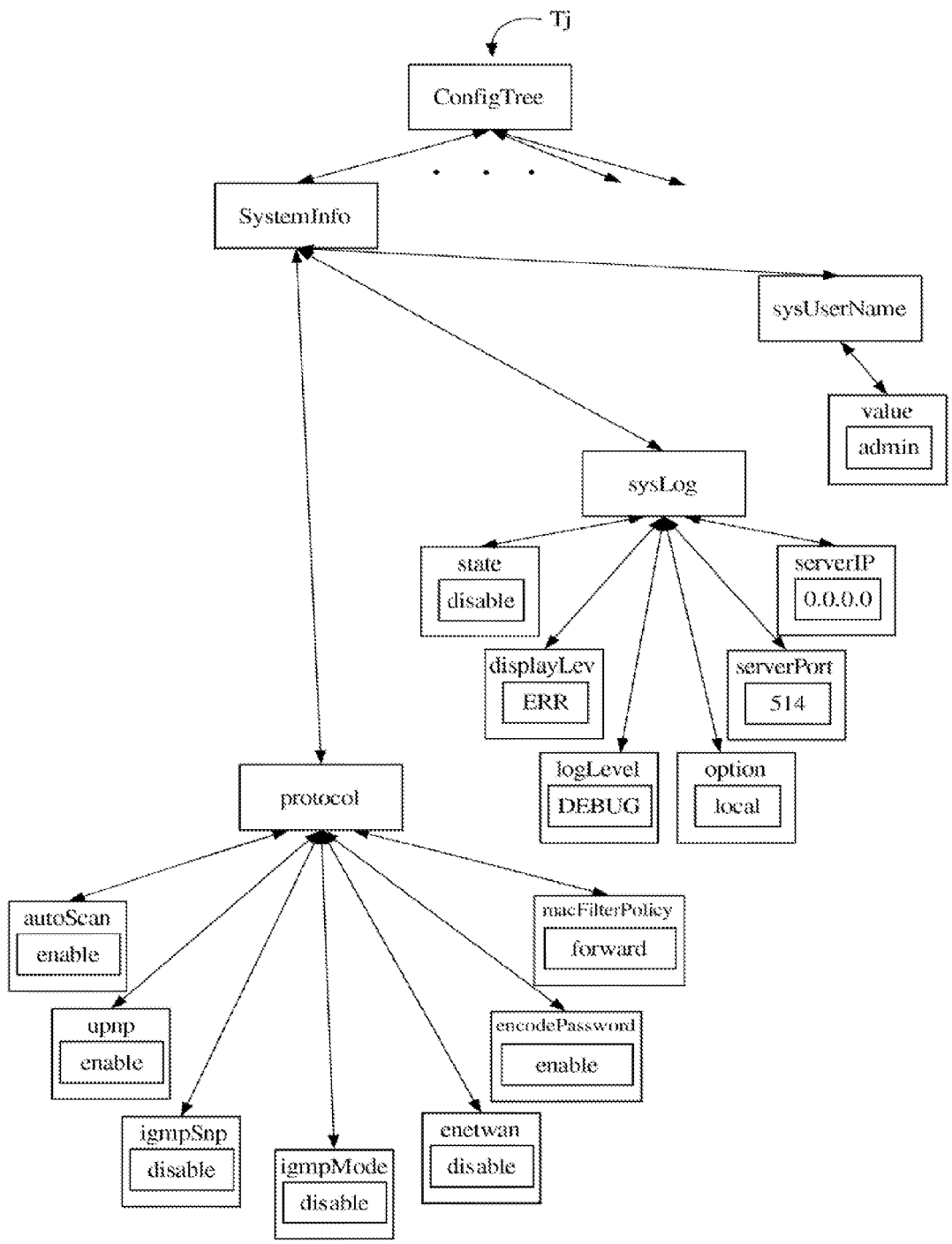
FIG. 6 is a schematic diagram of one embodiment of a portion of a configuration tree converted from a block B1 in the configuration parameters document of FIG. 5.

FIG. 5 shows an example of the configuration document 12 corresponding to a portion of a configuration tree shown in FIG. 6. Configuration parameters recorded in a configuration document 12 are between <ConfigTree> and </ConfigTree>. Configuration parameters related to asynchronous transfer mode (ATM) communication are between <AtmCfg> and </AtmCfg>. Between <AtmCfgTd> and </AtmCfgTd> are configuration parameters related to link types of ATM communication. For example, "CBR" specifies "constant bit rate". Between <AtmCfgVcc> and </AtmCfgVcc> are configuration parameters related to permanent virtual circuit (PVC). Between <SecCfg> and </SecCfg> are configuration parameters related to network security. Between <WirelessCfg> and </WirelessCfg> are configuration parameters related to wireless local area network (wireless LAN, IEEE 802.11). Between <RouteCfg> and </RouteCfg> are static routing tables of the electronic device system 200. Between <PMapCfg> and </PMapCfg> are configuration parameters related to port mapping. <SNTPCfg> and </SNTPCfg> are configuration parameters related to network time service, that is for configuring a simple network time protocol (SNTP) server. Between <Voice> and </Voice> are configuration parameters related to voice over Internet protocol (VoIP). Between <pppsrv_8_35> and </pppsrv_8_35> are configuration parameters related to point-to-point protocol (PPP). Between <wan_8_35> and </wan_8_35> are parameters for configuring wide area network (WAN) ports, which is closely related to the ATM PVC configuration.

The kernel 13 or each application in the electronic device system 200 may initiate the conversion from the document 12a to a configuration tree. For example, the kernel may initiate the conversion upon bootstrap of the electronic device system 200. Alternatively, an application Ai (wherein i is an positive integer, and $1 \leq i \leq n$) may initiate the conversion up initialization of the application Ai. The kernel 13 or each of the applications A1-An may utilize the API 30 to convert the document 12a to representative data thereof in a specific intermediate format, and the device driver further establishes a configuration tree corresponding to the document 12a from the representative data.

Figure 7:
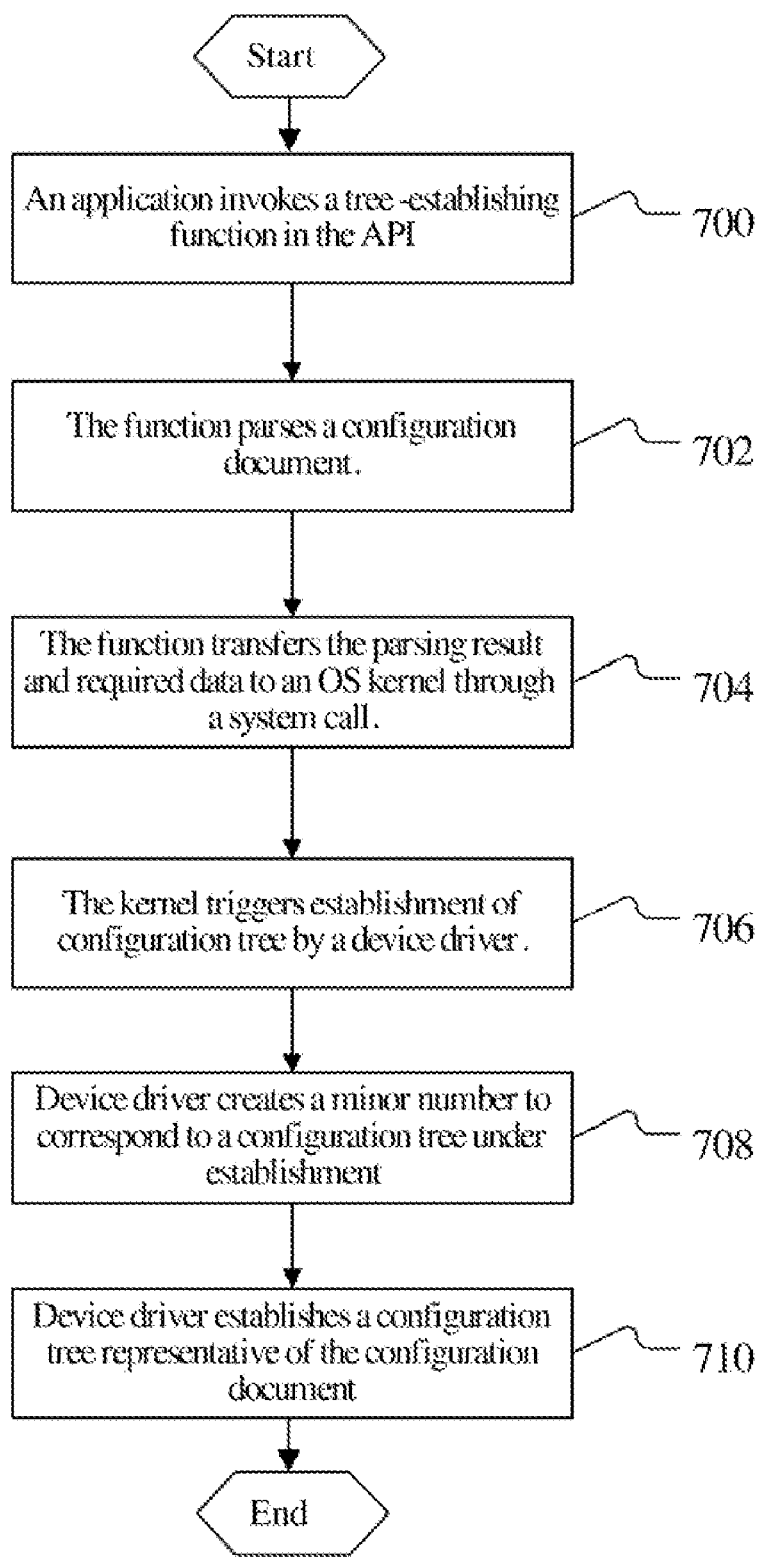
FIG. 7 is a flowchart of one embodiment of a configuration tree construction in the electronic device system.

A process is a program in execution by the processor 10 and may comprise an executed application, or kernel. With reference to FIG. 7, when a first process in the electronic device system 200 is to establish a configuration tree, the process invokes a tree-establishing function in the API 30 (step 700). The invocation comprises a filename of the device file 36 corresponding to the device driver 34. The tree-establishing function acts as a parser module to parse the document 12a and generate representative data comprising parameter values and parameter relationships recorded in the document 12a in response to the invocation from the process (step 702). The attribute "autoScan" and the value thereof in the tag <protocol> may be, for example, represented by "protocol.autoScan=enable" in the representative data in step 702. The tree-establishing function further transfers the filename of the device file 36, the representative data, and other required data to the kernel 13 through a system call 32 provided by the OS of the electronic device system 200 (step 704). The kernel 13 retrieves the device file 36 based on the filename, subsequently retrieves the device driver 34 based on the major number N1 in the device file 36, and transfers the representative data to the device driver 34, thus to trigger configuration tree establishment by the device driver 34 (step 706). The device driver 34 creates a minor number in the minor number set N2 to correspond to the to-be-established configuration tree (step 708). The device driver 34 accordingly utilizes the representative data to establish a configuration tree Tj representative of the representative data and the document 12a (step 710). The variable j is a positive integer, and $1 \leq j \leq m$.

FIG. 6 shows a portion of the configuration tree generated from a block B1 in the document 12a. Tags <SystemInfo> and </SystemInfo> has tag name "SystemInfo" and encloses tags respectively with tag names "protocol", "sysLog", and "sysUserName". Accordingly, the device driver 34 creates nodes respectively corresponding to parameters and tags associated with "SystemInfo", "protocol", "sysLog", and "sysUserName" in the corresponding configuration tree of the document 12a in response to the invocation in step 700, wherein the node of "SystemInfo" is a parent node of the nodes of "protocol", "sysLog", and "sysUserName". Since the tag of "protocol" comprises attributes of "autoScan", "upnp", "igmpSnp", "igmpMode", "macFilterPolicy", "encodePassword" and "enetwan", the device driver 34 accordingly creates nodes corresponding to "autoScan", "upnp", "igmpSnp", "igmpMode", "macFilterPolicy", "encodepassword" and "enetwan" to be children nodes of the node of "protocol". Each node corresponding to an attribute comprises the value of the attribute. The device driver 34 may similarly create children nodes of the nodes of "sysLog" and "sysUserName" and other nodes in the configuration tree.

Figure 8:
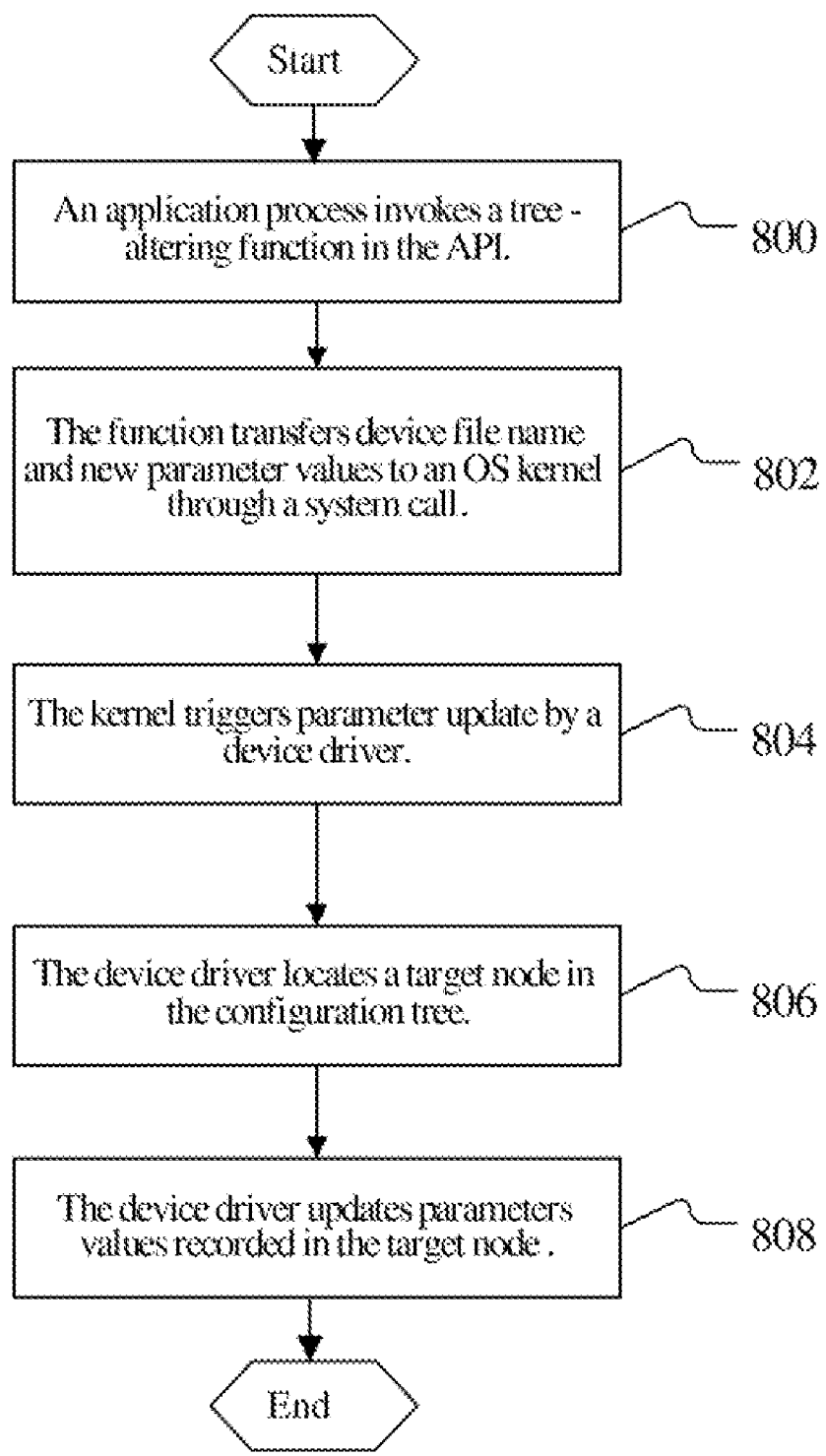
FIG. 8 is a flowchart of one embodiment of a configuration tree modification in the electronic device system.

After the configuration tree Tj has been established, parameter values in nodes of the configuration tree Tj may be read or modified by other processes. With reference to FIG. 8, when a second process in the electronic device system 200 is to modify a specific node in the configuration tree Tj (referred to as a target node hereafter), the second process invokes a function in the API 30 for modifying the configuration tree (step 800). The second process may be a process of any of the application A1-An or the kernel 13. The invocation in step 800 comprises a filename of the device file 36 corresponding to the device driver 34, new configuration parameter values, and other data as required. For example, a PPP or DHCP process receives a new IP address of the electronic device system 200 as a new configuration parameter value from a WAN and accordingly utilizes the new IP address to update an original IP address of the electronic device system 200 recorded in a target node in the configuration tree Tj. The invocation in step 800 may comprise the name of the target node and the path from the root of the configuration tree Tj to the target node. The path may comprise names of ancestor nodes of the target node.

The modifying function invoked in step 800 transfers the filename, the name of the target node, and new configuration parameter values to the kernel 13 through a system call provided by the OS of the electronic device system 200 (step 802). The kernel 13 retrieves the device file 36 based on the filename, subsequently retrieves the device driver 34 based on the major number N1 in the device file 36, and transfer the new configuration parameter values to the device driver 34, thus to trigger the device driver 34 to update parameter values in the target node (step 804). The device driver 34 locates the target node in the configuration tree Tj (step 806) and utilizes the new configuration parameter values to update parameters values recorded in a target node (step 808). In step 808, the device driver 34 may retrieve the target node based on the path directing thereto or by searching the entire configuration tree Tj.

In FIG. 6, the IP address of electronic device system 200 in the configuration tree Tj is generated from an attribute 'address="192.168.1.1"' in "entry1" tags in block B2. After the IP address update, a firewall program in the electronic device system 200 may read the new IP address of the electronic device system 200 from the configuration tree Tj and utilize the new IP address to perform firewall functions. Similarly, a network address translation (NAT) program in the electronic device system 200 may read the new IP address of the electronic device system 200 from the configuration tree Tj and utilize the new IP address to perform NAT functions.

Figure 9:
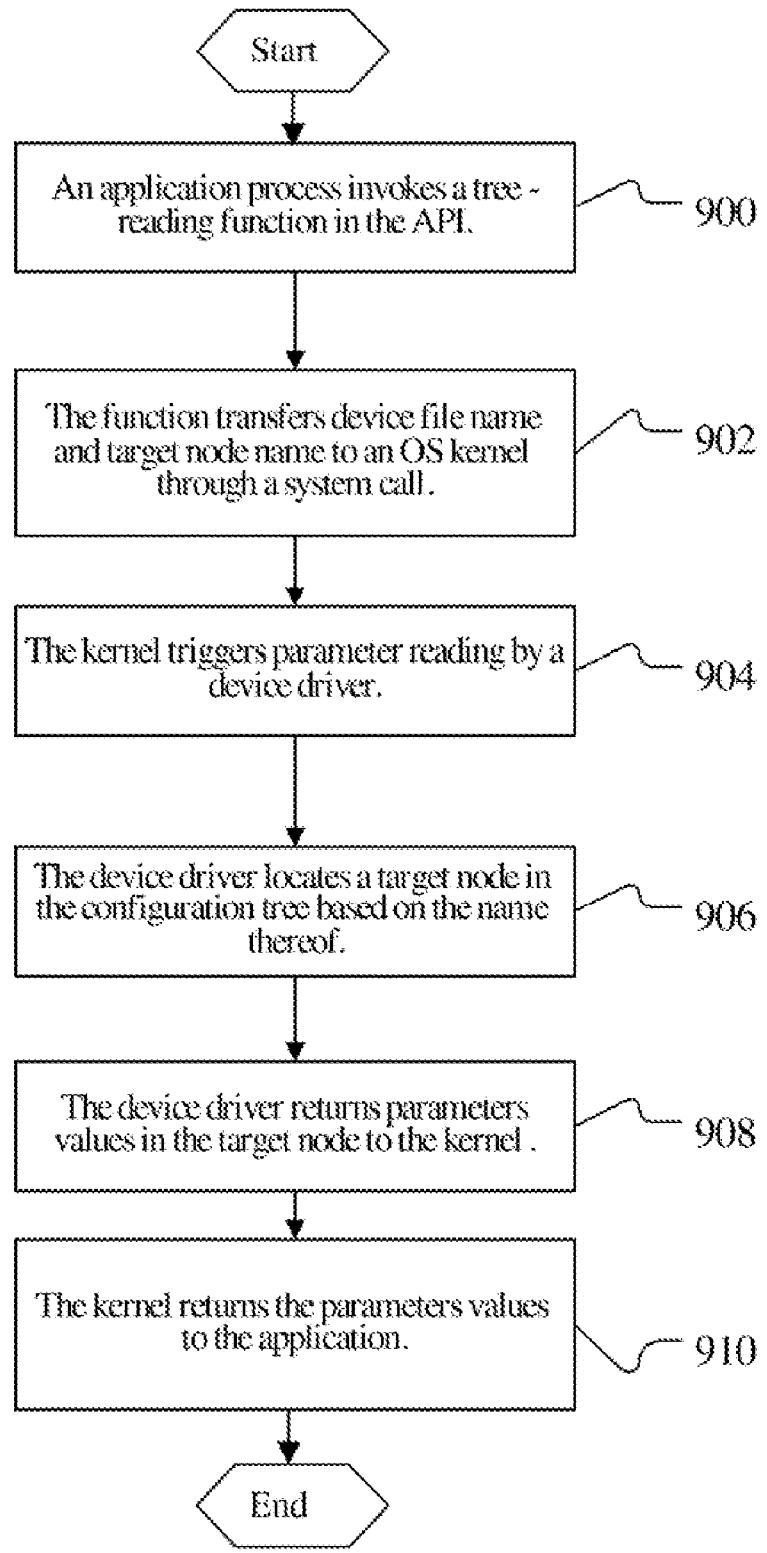
FIG. 9 is a flowchart of one embodiment of a node retrieval from a configuration tree in the electronic device system.

With reference to FIG. 9, when a third process in the electronic device system 200 is to read a specific node in the configuration tree Tj (referred to as a target node hereafter), the third process invokes a function in the API 30 for reading the configuration tree (step 900). The third process may be a process of the applications A1-An or the kernel 13. The invocation in step 800 comprises a filename of the device file 36 corresponding to the device driver 34 and the name of the target node. The invocation in step 900 may comprise the path from the root of the configuration tree Tj to the target node. The path may comprise names of ancestor nodes of the target node.

The reading function invoked in step 900 transfers the filename and the name of the target node to the kernel 13 through a system call provided by the OS of the electronic device system 200 (step 902). The kernel 13 retrieves the device file 36 based on the filename, subsequently retrieves the device driver 34 based on the major number N1 in the device file 36, and transfers the name of the target node to the device driver 34, thus triggering the device driver 34 to locate the target node and retrieve parameter values in the target node based on the node name (step 904). The device driver 34 locates the target node in the configuration tree Tj based on the node name of the target node (step 906) and returns parameter values therein to the kernel 13 (step 908). The kernel 13 further returns the parameter values retrieved from the target node to the third process (step 910). In step 906, the device driver 34 may retrieve the target node based on the path directing thereto or by searching the entire configuration tree Tj.

Utilizing the disclosed method, the application A1-An and the kernel 13 may share and synchronize configuration parameters. The method may be implemented in alternative embodiments. For example, the electronic device system 200 can comprise a system configuration process. The system configuration process allows a username, currently "admin" as shown in FIG. 6, to be recorded in the child node "value" of the node "sysUserName". The system configuration process provides a user interface to receive setting of the configuration parameters, such as "logLevel", in the configuration tree in FIG. 6 from a user. Here, each program in the electronic device system 200 records relative events of the program during execution thereof in a log file. The electronic device system 200 may transmit the log file to an external server for further analysis. Each program in the electronic device system 200 determines the complexity of event recording related to the program based on a parameter value in the node "logLevel". For example, each program in the electronic device system 200 may determine event types based on a parameter value in the node "logLevel" and records no event except events of the determined types. Values recorded in node "sysUserName" and "logLevel" can be set, read, or modified according to the method as described.

The electronic device system 200 further comprises a user authentication process. The system configuration process provides a user interface to receive setting of an IP address of a remote device capable of remotely accessing the electronic device system 200, and stores the IP address of the remote device between <TelnetAcl> and </TelnetAcl> in block B3 of the document 12a. After configuration parameters in the block B3 has been converted to one node in the configuration tree Tj, the system configuration process may add, delete, or modify the IP address in the node. The user authentication process may access and utilize the IP address of the remote device to accordingly provide access control of the electronic device system 200 to any user from any remote device.

The disclosed method can assist the current system design. The application A1-An and the kernel 13 may share and synchronize configuration parameters utilizing the disclosed method. The disclosed method is preferably implemented in Linux/Unix-similar OS environments.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device system capable of sharing configuration parameters among processes, comprising:
    a main memory operable to store a user space and a kernel space, wherein the user space stores a plurality of applications and a document recording a set of configuration parameters privileged to a first application of the plurality of applications of the electronic device system;
    a parser module in an application programming interface (API) of the electronic device system operable to retrieve the set of configuration parameters by parsing the document in response to an invocation from the first application; and
    a device driver operable to build and access a data structure for the set of configuration parameters in the kernel space of the main memory based on output of the parsing, wherein at least two of the plurality of applications perform different functions of the electronic device system by accessing the data structure of the set of the configuration parameters through the device driver even if the set of the configuration parameters is updated by one of the plurality of applications, wherein the at least two of the plurality of applications perform the accessing of the data structure by issuing a call through the device driver and receiving a reply of the call from the device driver;
    wherein the first application sets a value of one of the configuration parameters in a node of the data structure specifying the complexity of event recording by other applications in the electronic device system, and a second application of the electronic device system determines which type of events to record according to the value of the one of the configuration parameters in the node.

2. The electronic device system as claimed in claim 1, wherein an operating system executed by the electronic device system comprises a kernel which retrieves the set of the configuration parameters through the device driver and the data structure.

3. The electronic device system as claimed in claim 1, wherein an object under control of the device driver is represented by a device file, and is accessed through a system call provided by the electronic device system based on the filename of the device file, wherein the object under control of the device driver comprises a data structure collection comprising the data structure of the set of configuration parameters of the first application.

4. The electronic device system as claimed in claim 3, wherein the device file comprises a major device number and at least one minor device number, when the data structure of the set of configuration parameters of the first application comprises a plurality of data structure instances each represented by a minor device number.

5. The electronic device system as claimed in claim 4, wherein the data structure of the set of configuration parameters comprises a tree structure, and the device file comprises a character device file.

6. The electronic device system as claimed in claim 1, wherein the first application obtains and stores an Internet protocol address of the electronic device system in the data structure, and a second application of the electronic device system retrieves the Internet protocol address to perform network address translation.

7. The electronic device system as claimed in claim 1, wherein the first application sets up an Internet protocol address of a remote device capable of remotely accessing the electronic device system in the data structure, and the second application controls access from the remote device to the electronic device system according to the Internet protocol address of the remote device in the data structure.

8. A method of sharing configuration parameters among applications, executable in an electronic device system with a main memory storing a plurality of applications and a device driver, comprising:
    requesting a parser module in an application programming interface (API) of the electronic device system by a first application of the plurality of applications stored in a user space in the main memory to access a set of configuration parameters privileged to the first application, wherein the main memory stores a kernel space and the user space;
    parsing of a document recording the set of configuration parameters by the parser module to retrieve the set of configuration parameters in response to the request from the first application; and
    building a data structure for the set of configuration parameters in the kernel space of the main memory by the device driver based on output of the parsing, wherein at least two of the plurality of applications perform two different functions of the electronic device system by accessing the data structure of the set of configuration parameters through the device driver even if the set of the configuration parameters is updated by one of the plurality of applications, wherein the at least two of the plurality of applications perform the accessing of the data structure by issuing a call through the device driver and receiving a reply of the call from the device driver;
    wherein the first application sets a value of one of the configuration parameters in a node of the data structure specifying the complexity of event recording by other applications in the electronic device system, and a second application of the electronic device system determines which type of events to record according to the value of the one of the configuration parameters in the node.

9. The method as claimed in claim 8, wherein an operating system executed by the electronic device system comprises a kernel which retrieves the set of the configuration parameters through the device driver.

10. The method as claimed in claim 8, wherein an object under control of the device driver is represented by a device file, and is accessed through a system call provided by the electronic device system based the filename of the device file, wherein the object under control of the device driver comprises a data structure collection comprising the data structure of the set of configuration parameters of the first application.

11. The method as claimed in claim 10, wherein the device file comprises a major device number and at least one minor device number, and in condition that the data structure of the set of configuration parameters of the first application comprises a plurality of data structure instances, each of the data structure instances is represented by a minor device number.

12. The method as claimed in claim 11, wherein the data structure of the set of configuration parameters comprises a tree structure.

13. The method as claimed in claim 12, wherein the device file comprises a character device file.

14. The method as claimed in claim 8, wherein the first application obtains and stores an Internet protocol address of the electronic device system in the data structure, and a second application of the electronic device system retrieves the Internet protocol address to perform network address translation.

15. The method as claimed in claim 8, wherein the first application sets up an Internet protocol address of a remote device capable of remotely accessing the electronic device system in the data structure, and the second application controls access from the remote device to the electronic device system according to Internet protocol address of the remote device in the data structure.

* * * * *